(12) United States Patent
VanBlon et al.

(10) Patent No.: US 11,488,593 B2
(45) Date of Patent: Nov. 1, 2022

(54) PROVIDING EXTENDED INFORMATION WITHIN A DIGITAL ASSISTANT RESPONSE

(71) Applicant: Lenovo (Singapore) Pte. Ltd., Singapore (SG)

(72) Inventors: Russell Speight VanBlon, Raleigh, NC (US); Ryan Charles Knudson, Durham, NC (US); Roderick Echols, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 16/587,555

(22) Filed: Sep. 30, 2019

(65) Prior Publication Data
US 2021/0097985 A1    Apr. 1, 2021

(51) Int. Cl.
*G10L 15/22* (2006.01)
*G06F 3/01* (2006.01)
*G06F 16/903* (2019.01)

(52) U.S. Cl.
CPC .............. *G10L 15/22* (2013.01); *G06F 3/013* (2013.01); *G06F 16/90335* (2019.01); *G06F 2203/011* (2013.01); *G10L 2015/221* (2013.01); *G10L 2015/223* (2013.01); *G10L 2015/225* (2013.01)

(58) Field of Classification Search
CPC ...... G06F 3/013; G06F 3/01; G06F 16/90335; G06F 16/903; G06F 2203/011; G06F 16/3326; G06F 16/3329; G06F 16/332; G06F 3/015; G10L 2015/225; G10L 2015/223; G10L 2015/221; G10L 15/22
See application file for complete search history.

(56) References Cited

U.S. PATENT DOCUMENTS

| | | | |
|---|---|---|---|
| 2016/0335264 A1* | 11/2016 | Behal | G06F 16/951 |
| 2017/0031433 A1* | 2/2017 | Abou Mahmoud | G06F 3/013 |
| 2018/0349447 A1* | 12/2018 | Maccartney | G06F 16/9535 |
| 2020/0098358 A1* | 3/2020 | Rakshit | G06F 16/24575 |
| 2020/0380389 A1* | 12/2020 | Eldeeb | G06N 20/00 |

* cited by examiner

*Primary Examiner* — Huyen X Vo
(74) *Attorney, Agent, or Firm* — Ference & Associates LLC

(57) ABSTRACT

One embodiment provides a method, comprising: receiving, at a digital assistant of an information handling device, a query from a user; providing, using the digital assistant, a response to the query; determining, during provision of the response, interest of the user in a topic contained within the response; and providing, based on the interest, extended information related to the topic. Other aspects are described and claimed.

18 Claims, 3 Drawing Sheets

PROVIDING EXTENDED INFORMATION WITHIN A DIGITAL ASSISTANT RESPONSE

BACKGROUND

Digital personal assistants (DPAs) have become a common-use piece of technology. Whether it is a standalone DPA or a DPA that is built into an information handling device, for example, a smartphone, tablet, personal computer, laptop, wearable device, or the like, the number of users utilizing DPAs is increasing. Up to this point, the queries directed to DPAs have been simple, single response questions. For example, a user may ask a DPA, "what is the capital of Idaho?" which would then cause the DPA to respond "Boise" or, possibly, provide a longer response like "the capital of Idaho is Boise." However, as the commonality of DPA use increases, the queries have become more complex, becoming more like conversations with other people. Yet the types of responses given by the DPA have remained primarily unchanged.

BRIEF SUMMARY

In summary, one aspect provides a method, comprising: receiving, at a digital assistant of an information handling device, a query from a user; providing, using the digital assistant, a response to the query; determining, during provision of the response, interest of the user in a topic contained within the response; and providing, based on the interest, extended information related to the topic.

Another aspect provides an information handling device, comprising: a processor; a memory device that stores instructions executable by the processor to: receive, at a digital assistant of an information handling device, a query from a user; provide, using the digital assistant, a response to the query; determine, during provision of the response, interest of the user in a topic contained within the response; and provide, based on the interest, extended information related to the topic.

A further aspect provides a product, comprising: a storage device that stores code, the code being executable by a processor and comprising: code that receives, at a digital assistant of an information handling device, a query from a user; code that provides, at a digital assistant, a response to the query; code that determines, during provision of the response, interest of the user in a topic contained within the response; and code that provides, based on the interest, extended information related to the topic.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
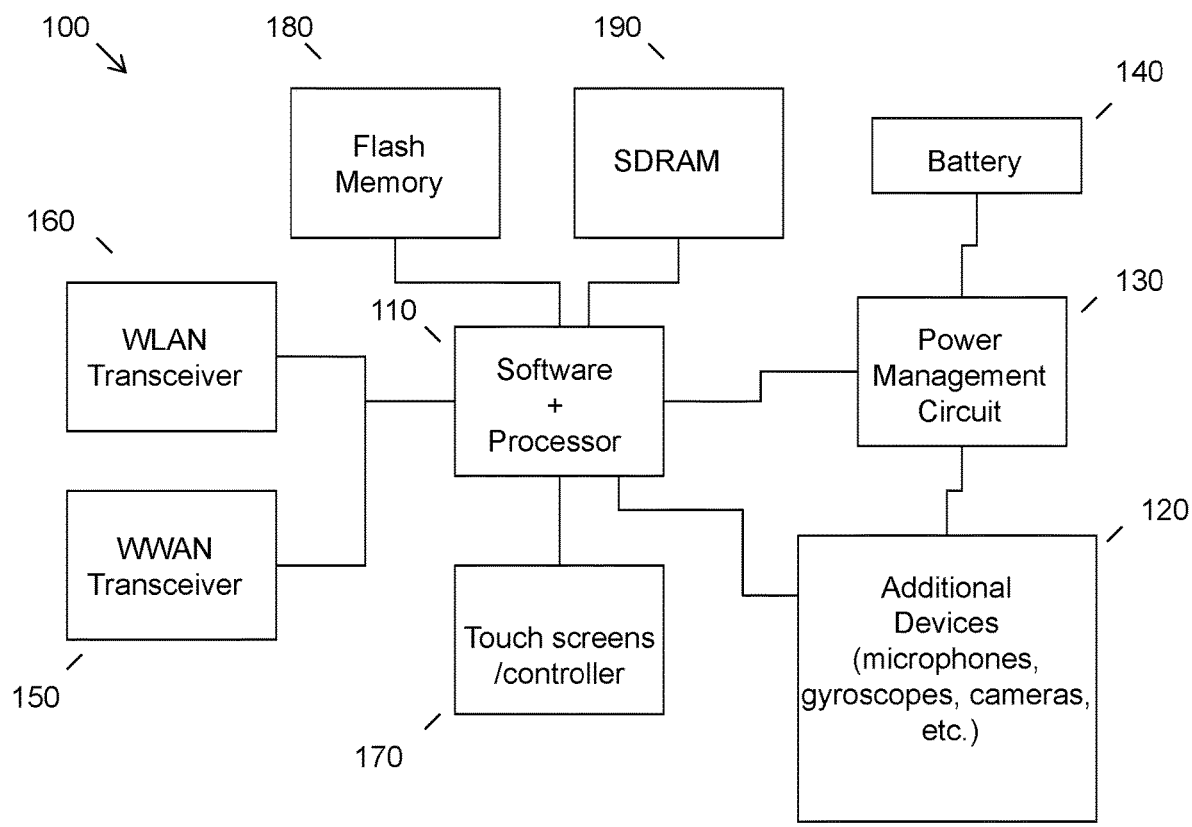
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In conventional methods, digital personal assistants will provide a single response to a user based on the information contained in a query provided by a user. A single response is a response that is germane to the query. In other words, the single response is a response that directly answers or responds to the query provided by the user, but that provides no additional information. The single piece of information may include a short response provided back to the user. For example, a user may ask a DPA, "what color is a banana?" The DPA would then provide a response similar to "bananas are most commonly the color yellow." Additionally, a single piece of information also refers to responses by the DPA that include multiple steps or parts, but that still corresponds to the single piece of information with no additional information. For example, a user may ask a DPA "what are the three most populous cities in the U.S.?" The DPA may then provide a response similar to "the three most populous cities in the U.S. are New York City, Los Angeles, and Chicago." Though the response in the latter example provides more information than the previous example response, it is still classified as a single response because each response was associated with a single piece of information that was presented in the query.

As an attempt to provide more information relative to a topic with a user query, a digital personal assistant may ask a user if they wish to hear more information regarding a topic after an initial response is given. As an example, and related to a previous example, after the DPA provides the response regarding the three most populous cities in America, the DPA may ask a user if they would like more information regarding the topic. For example, a DPA may ask, "would you like to know the population in New York City?" Depending on the user's response or lack of response, a DPA will either provide the additional information to the user or will deactivate without providing the additional information. Thus, the conventional techniques require the DPA to specifically request user input and then receive user input for the user to receive any additional information related to a topic.

Accordingly, an embodiment provides a method that emulates human interactions to detect when a person is interested in more information regarding a response currently being provided by a digital assistant. In other words, while a DPA is responding to a query, the DPA may recognize that a user is interested in a mentioned topic based on interactions by the user with respect to the DPA. In an embodiment and used as a non-limiting example, a DPA may utilize an eye-tracking technique to recognize when a user is more interested in a topic. For example, while the DPA is relaying the news as requested by the user, a DPA may notice that during a particular news story the user may look towards the DPA highly focused which may be recognized and used to determine that the user is interested in the subject of the story being relayed. After the system determines that a user is interested in a topic, the DPA may automatically provide extended information, if applicable, about the topic of interest.

Recognition of a user's interest may be user specific and may also be learned over time. If more than one person utilizes a DPA, then the DPA may recognize which user is providing a query, and based on previously recognized and then recorded areas of interest, a DPA may provide extended information regarding a topic that a user has shown interest in during past interactions. Additionally, in an embodiment, a DPA may provide an indication that extended information regarding a topic is available, which may further entice a user to show interest in a topic. Thus, the described system and method is directed to detecting user interest in a topic while the DPA is providing information related to a user's initial query, and further providing extended information to the user associated with a topic that is identified as being of interest to the user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
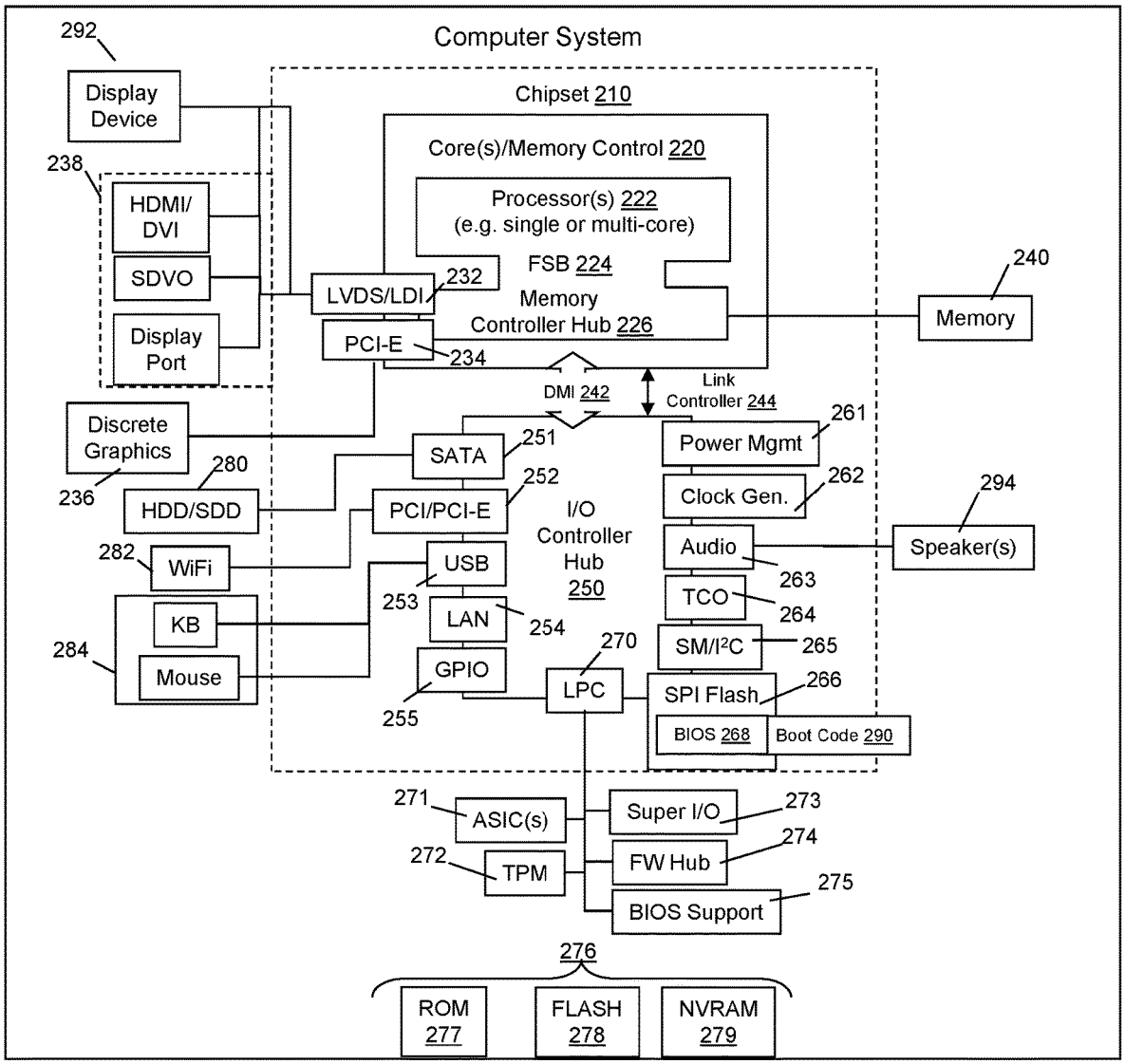
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart TVs, laptops, virtual or augmented, or mixed reality head mounted devices, and/or other electronic devices that may include digital assistants. For example, the circuitry outlined in FIG. 1 may be implemented in a tablet or smart phone embodiment, whereas the circuitry outlined in FIG. 2 may be implemented in a laptop.

Figure 3:
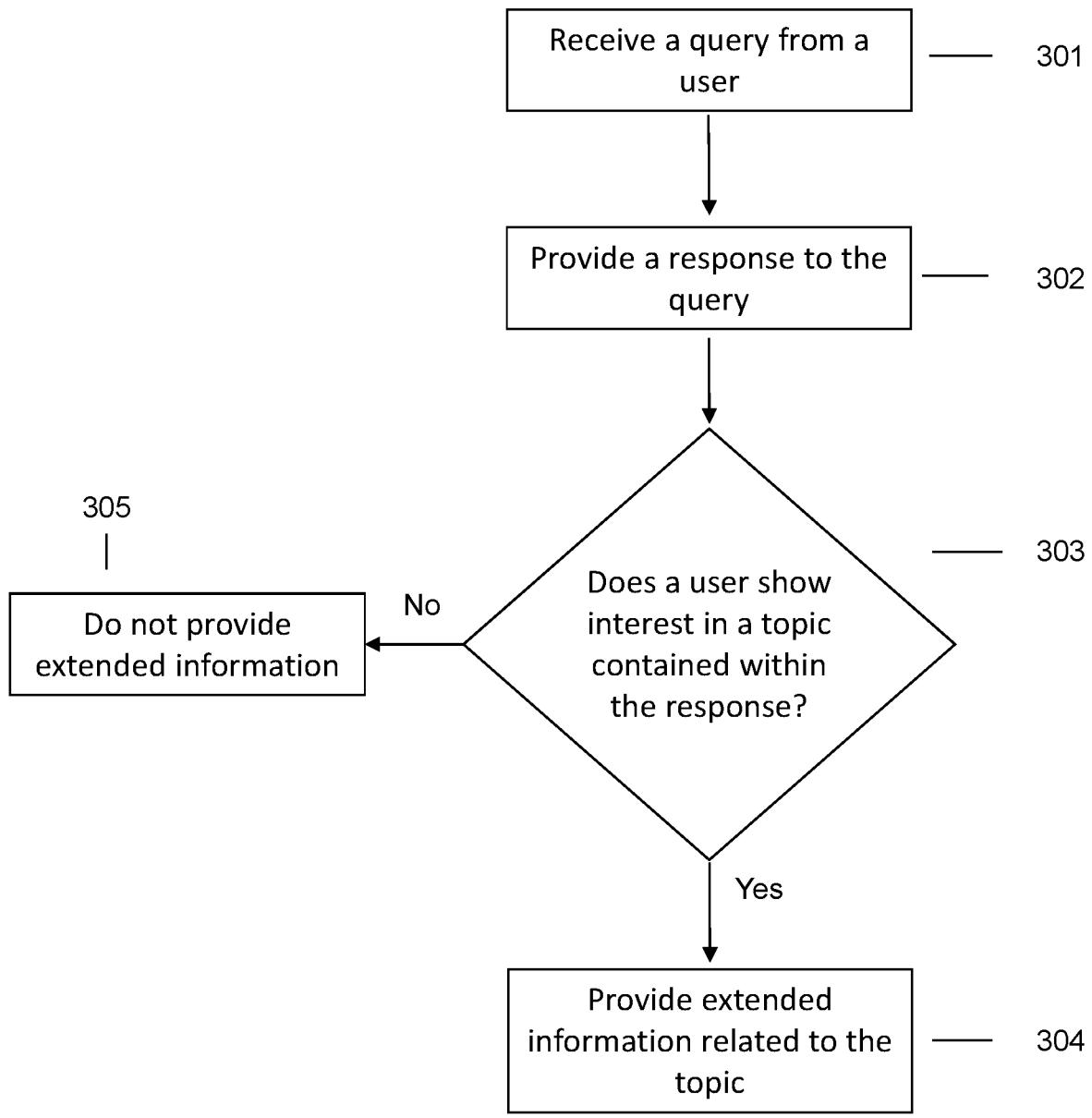
FIG. 3 illustrates an example method of providing extended information associated with a topic of interest within a digital personal assistant response.

Referring now to FIG. 3, a method is illustrated to describe the process that a digital personal assistant may undergo in determining when to provide extended information associated with a topic contained within a digital personal assistant response. In other words, the method describes emulating human interactions to detect when a person is interested in more information regarding a topic that is currently being provided by a digital assistant. At 301, a digital personal assistant may receive a query from a user. A query provided by a user may be any form of user input that may be understood by a DPA, and will warrant a response from the DPA. For ease of understanding the described invention and used as a non-limiting example throughout the rest of this application, a user query may be understood as being a verbal command. However, other command modalities may be utilized, for example, a text command, a gesture command, or the like.

The query supplied by a user to a DPA may cause a DPA to provide a response back to the user, at 302. As mentioned previously, a response provided back to a user may comprise a single topic short response, for example, a single item response such as "bananas are most commonly the color yellow," or a multiple part answer associated with a single topic, such as providing a list. Additionally, in an embodiment, DPAs may be used to provide scripted segments to a user that may run for an extended period of time. For example, if a user asks a DPA to "read me the news," a DPA may respond with scripted stories regarding multiple subjects that may run for a plurality of minutes. A scripted response may include multiple topics, and depending on the amount of information related to a topic, the amount of time to relay the topic specific information may fluctuate. In an embodiment, a DPA may be able to differentiate between topics included in scripted response.

At 303, during a response provided by the digital personal assistant, the system may attempt to determine if the user is interested in any topic contained within the response being provided by the digital assistant. Determining if the user is interested in a topic may be performed by the information handling device corresponding to the device of the digital assistant. Alternatively, the system may utilize a secondary device operatively coupled to the digital personal assistant device to determine if a user is interested in a topic being relayed by the DPA. In an embodiment, at 305, a system may determine that the user is not interested in a topic being conveyed by the DPA with the response. In this situation, extended information related to a topic may be repressed or not provided by a system, thereby only supplying the information contained in the initial single response to a user.

When user interest in a topic is determined to be present, extended information related to the topic contained with the response is provided to a user at 304. In an embodiment, determining user interest may be performed using eye-tracking techniques. In an embodiment, the eye-tracking may be performed using a chatbot that watches a user while a response is being provided from the DPA. For example, the chatbot may be an icon, application window, or the like, that is associated with the digital assistant and that has gaze or eye tracking capabilities. In one embodiment, the eye-tracking may be performed using a device, for example, a camera, sensors, or the like, that can watch, track, or detect the location of the gaze of the user. Interest of the user in a topic contained within a response may be identified if a user looks at the DPA while the DPA is providing the response. The interest may also be based upon the user looking at the DPA for a predetermined length of time. In other words, similar to determining interest in a human-to-human interaction, attention or interest may be determined because the person is looking at who/what is relaying information. In this system, what is relaying the information and potentially being looked at is the DPA.

In an embodiment, a system may determine a user interest in a topic based on an audible response. An audible response may be the recognition, by a device, of an onomatopoeia that may depict the user's interest. For example and used as non-limiting examples, a user may provide an "ahh" which is commonly associated with a person coming to a realization, or a user may provide a "humph" which is commonly associated with a person not thoroughly understanding a topic. These may indicate that a user would like to learn more information with respect to the topic. A memory device associated with a digital personal assistant may comprise onomatopoeia associations that indicate a user interest. Additionally, the system may have the ability to learn and store onomatopoeias that may be user specific. Other audible responses, other than onomatopoeias, may indicate that a user is interested in a topic, for example, a user may provide spoken words indicating interest, may make a particular noise that has been previously associated with user interest, or the like.

In embodiment, a system may utilize an image capturing device coupled to a digital personal assistant to determine user interest in a topic based on gesture input. Being that the vast majority of communication in this world is provided non-verbally, users may commonly use gestures to relay interest. In an embodiment, a system may recognize that a gesture being made by a user, and based on an association stored in a memory device associated with a DPA, is associated with a user requesting extended information related to the topic currently being relayed in response to the initial user query. For example, a user may perform a circular, forward rotating hand gesture exemplifying the desire for extended information associated with a topic. User specific gestures may be implemented into a system to assist in determining user interest in a topic.

Another embodiment may utilize health metrics monitors to determine user interest in a topic. A health monitor may be located on a user, and based on the biometric data retrieved by a health monitor and translated to a DPA, a system may be able to determine user interest in a topic currently being relayed by the DPA. Human traits such as, but not limited to, heart rate and blood flow may change when a user is interested in a topic. The ability to potentially track emotional interest in a topic being relayed by a DPA via health monitors may indicate to the system to provide extended information regarding a topic when the biometric data from the health monitors demonstrates an association of interest with the topic currently being talked about. For example, when a heart rate of a user, as detected by a smart watch that the user is wearing, increases when the DPA is relaying information related to a hiking incident, the DPA, based upon the increase in heart rate, may fluidly provide extended information associated with the hiking incident.

The system may also use historical topic analysis to determine if a user is interested in a topic. The historical topic analysis may be unique to a user. In other words, the system may employ a historical topic analysis that is user specific. The historical topic analysis may include associations between topics and interest levels of a user. For example, the historical topic analysis may include topics and then include an indication of whether the user is interested in such topics. The historical topic analysis may also include associations between user responses and interest levels. For example, the historical topic analysis may indicate that a particular noise, gesture, look length, health metric, or the like, is associated with a user being interested.

Detecting interest of a user in a topic may allow a system to provide extended information without interrupting the response currently being supplied by the DPA. A system may determine that a user's interest in a topic is present and as a result of the determination of interest in the topic, the extended information related to the topic may be fluidly worked into a response. In other words, as a DPA is providing a response to a user, and interest of the user in a topic is determined, a system may provide the extended information related to the topic before moving onto providing information about another topic associated with the initial response. For example, as a DPA is providing the news to a user, the second of three total stories that are scheduled to be provided as the initial response to the query of the user may grab the user's interest causing the user to look at the DPA. When a system determines that interest in the second of the three topics is present, the extended information related to the second news story will be provided before the third news story contained in the initial response. Providing the extended information related to a topic directly after interest is determined permits a fluid transition from the initial response to the extended information. Rather than interrupting the initial response and a user providing another query to a DPA instructing it to provide additional information related to the topic, as is required in conventional methods, a system may transition from the original information being provided in a response to the extended information related to a topic of interest without interruption.

In an embodiment, a system may provide an indication to a user that extended information associated with a topic may be available. In an embodiment, a system may provide a visual indication that additional information regarding a topic may be provided if a user desires such information. For example, a system may provide a colored ring or an indication on display coupled to the DPA. In an embodiment, a system may provide an audible indication that additional information regarding a topic may be provided. For example, as a DPA is providing a response, a user may take note of a beep or a subtle chime in the background of the response identifying that extended information related to the topic currently being discussed is present. In an embodiment, a system may provide a haptic indication that additional information regarding a topic may be available or provided. For example, as a DPA is providing a response, a user may take note of a vibration identifying that extended information related to the topic currently being discussed is present.

The situation may arise where a system may misconstrue a user's interest in a topic. In an embodiment where this situation arises, a user may provide a traditional verbal command to the digital personal assistant to stop providing the extended information related to a topic. In an embodiment, a user may elect to stop the extended information from being provided, and permit the continuation of the information associated with the initial response to the query provided by the user. Alternatively, in another embodiment, a user may elect to stop relaying all information or output from the DPA.

The various embodiments described herein thus represent a technical improvement to conventional methods for providing responses by a digital personal assistant. Using the techniques described herein, an embodiment may detect user interest in a topic that is being provided by a digital personal assistant in response to a user's initial query. An embodiment may then fluidly transition from the original information collected for the initial response to the user query, to seamlessly providing extended information associated with a determined topic of interest. The use of secondary devices coupled to the digital personal assistant may assist a DPA in determining a user's interest in a topic. Such a method may permit the digital personal assistant to present all extended information associated with e topic without facing interruptions or stoppages.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at a digital assistant of an information handling device, a query from a user;
providing, using the digital assistant, a response to the query;
determining, during provision of the response, interest of the user in a topic contained within the response, wherein the determining the interest of the user in a topic comprises utilizing a secondary device comprising one or more sensors and operatively coupled to the information handling device to capture an indication of interest associated with a topic in the response, wherein the indication of interest is at least partially determined based upon a historical topic analysis identifying a correlation between a user input and an interest by the user and additional audible input supplied from the user to the information handling device, wherein the additional audible input comprises receiving an onomatopoeia from the user at the information handling device and associating the onomatopoeia with the interest of the user in the topic being provided by the digital personal assistant; and
automatically providing, during provision of the response and based on the captured indication of interest associated with the topic, extended information related to the topic.

2. The method of claim 1, wherein the determining comprises using at least one other information handling device to track user interest.

3. The method of claim 1, wherein the determining comprises receiving eye-tracking input.

4. The method of claim 1, wherein the determining comprises receiving health metric information.

5. The method of claim 1, wherein the determining comprises receiving gesture input.

6. The method of claim 1, wherein the determining comprises utilizing historical topic analysis specific to the user.

7. The method of claim 6, wherein the historical topic analysis is updated based upon feedback provided by the user with respect to a topic.

8. The method of claim 1, further comprising providing an indication at the information handling device to a user indicating more information related to the topic is available.

9. The method of claim 8, wherein the indication comprises at least one of: a visual indication, an audible indication, and a haptic indication.

10. An information handling device, comprising
a processor;
a memory device that stores instructions executable by the processor to:
receive, at a digital assistant of an information handling device, a query from a user;
provide, using the digital assistant, a response to the query;
determine, during provision of the response, interest of the user in a topic contained within the response, wherein to determine the interest of the user in a topic comprises utilizing a secondary device comprising one or more sensors and operatively coupled to the information handling device to capture an indication of interest associated with a topic in the response, wherein the indication of interest is at least partially determined based upon a historical topic analysis identifying a correlation between a user input and an interest by the user and additional audible input supplied from the user to the information handling device, wherein the additional audible input comprises receiving an onomatopoeia from the user at the information handling device and associating the onomatopoeia with the interest of the user in the topic being provided by the digital personal assistant; and
automatically provide, during provision of the response and based on the captured indication of interest associated with the topic, extended information related to the topic.

11. The information handling device of claim 10, wherein the instructions executable by the processor to determine comprises using at least one information handling device to track user interest.

12. The information handling device of claim 10, wherein the instructions executable by the processor to determine comprises receiving eye-tracking.

13. The information handling device of claim 10, wherein the instructions executable by the processor to determine comprises receiving health metric information.

14. The information handling device of claim 10, wherein the instructions executable by the processor to determine comprises receiving gesture input.

15. The information handling device of claim 10, wherein the instructions executable by the processor to determine comprises utilizing historical topic analysis specific to the user.

16. The information handling device of claim 15, wherein the historical topic analysis is updated based upon feedback provided by the user with respect to a topic.

17. The information handling device of claim 10, wherein the instructions further executable by the processor comprise providing an indication at the information handling device to a user indicating more information related to the topic is available.

18. A product, comprising:
  a storage device that stores code, the code being executable by a processor and comprising:
    code that receives, at a digital assistant of an information handling device, a query from a user;
    code that provides, at a digital assistant, a response to the query;
    code that determines, during provision of the response, interest of the user in a topic contained within the response, wherein the code that determines the interest of the user in a topic comprises utilizing a secondary device comprising one or more sensors and operatively coupled to the information handling device to capture an indication of interest associated with a topic in the response, wherein the indication of interest is at least partially determined based upon a historical topic analysis identifying a correlation between a user input and an interest by the user and additional audible input supplied from the user to the information handling device, wherein the additional audible input comprises receiving an onomatopoeia from the user at the information handling device and associating the onomatopoeia with the interest of the user in the topic being provided by the digital personal assistant; and
  code that automatically provides, during provision of the response and based on the captured indication of interest associated with the topic, extended information related to the topic.

* * * * *